United States Patent

Bahuguna et al.

Patent Number: 6,111,671
Date of Patent: Aug. 29, 2000

[54] MATCH FILTERS FOR A REAL TIME FINGERPRINT SENSOR AND VERIFICATION SYSTEM

[75] Inventors: Ramendra D. Bahuguna; Thomas M. Corboline, both of San Jose, Calif.

[73] Assignee: Advanced Precision Technology, Inc., Livermore, Calif.

[21] Appl. No.: 09/444,050

[22] Filed: Nov. 18, 1999

Related U.S. Application Data

[60] Division of application No. 08/853,850, May 19, 1997, Pat. No. 6,002,499, which is a continuation-in-part of application No. 08/499,673, Jul. 7, 1995, Pat. No. 5,629,764, which is a continuation-in-part of application No. 08/694,671, Aug. 9, 1996, Pat. No. 5,892,599.

[51] Int. Cl.$^7$ ...................................................... G03H 1/00
[52] U.S. Cl. .............................. 359/30; 359/2; 359/561; 356/71
[58] Field of Search .................................. 359/2, 15, 30, 359/561; 356/71

[56] References Cited

U.S. PATENT DOCUMENTS

| | | | |
|---|---|---|---|
| 3,716,301 | 2/1973 | Caulfield et al. | 356/71 |
| 4,876,725 | 10/1989 | Tomko | 356/71 |
| 5,598,485 | 1/1997 | Kobayashi et al. | 359/561 |

*Primary Examiner*—Darren E. Schuberg
*Attorney, Agent, or Firm*—David E. Newhouse

[57] ABSTRACT

A real time fingerprint verification system includes a recording device and a verification device each having a fingerprint scanner for generating a flat, dimensionally undistorted, high contrast, fingerprint image, and an intensity sensitive, spatial light modulator (SLM) for receiving and transforming the flat fingerprint image into a planar, coherent light image. In the recording device, the planar coherent light image beam of the fingerprint from the SLM is Fourier transformed, and input into a microscope objective lens system which expands the Fourier transformed beam image sufficiently to allow mechanical blocking of its central portion or order, whereupon it is directed to interact as an object beam with a reference beam from the particular coherent light source to record a holographic matched filter. In the verification device, the planar coherent light image beam of the fingerprint is Fourier transformed and input into a microscope objective lens system to allow similar mechanical blocking of its central portion or order whereupon it is directed to interrogates a previously recorded holographic matched filter of a fingerprint image as an object beam for determining a match or not between the respective recorded and interrogating images. The spatial light modulator (SLM) in both the respective recording and verification devices enables phase correlation (optical path length determination) of one device to another device. X-Y alignment and rotational orinentation of the respective real time image and holographic matched filter image is accomplished by jittering (orbiting and angularly oscillating) either the interrogating object beam, real time, relative to the matched filter or visa versa.

12 Claims, 4 Drawing Sheets

MATCH FILTERS FOR A REAL TIME FINGERPRINT SENSOR AND VERIFICATION SYSTEM

RELATED APPLICATIONS

This application is division of application Ser. No. 08/853,850 filed May 9, 1997 in the United States of America by Thomas M. Corboline and entitled Ramendra D. Bahuguna "REAL TIME FINGERPRINT SENSOR AND VERIFICATION SYSTEM" now U.S. Pat. No. 6,002,499 issued Dec. 18, 1999 which in turn, comprised a continuation-in-part of: (i) application Ser. No. 08/499,673 filed Jul. 7, 1995 in the United States of America by Ramendra D. Bahuguna and Thomas M. Corboline entitled "A PRISM FINGERPRINT SENSOR USING A HOLOGRAPHIC OPTICAL ELEMENT" now U.S. Pat. No. 5,629,764 issued May 13, 1997 and (ii) application Ser. No. 08/694,671 filed Aug. 9, 1996 in the United States of America by Ramendra D. Bahuguna entitled "A MINIATURE FINGERPRINT SENSOR USING A TRAPEZOIDAL PRISM AND A HOLOGRAPHIC OPTICAL ELEMENT now U.S. Pat. No. 5,892,599 issued Apr. 6, 1999.

BACKGROUND OF THE INVENTION

1. Field of the Invention

The invention relates to a system for capturing high contrast, detailed optical fingerprint images, and recording the fingerprint images as an object in a Fourier transform hologram and subsequently comparing a Fourier transform of high contrast, detailed optical fingerprint images presented in a coherent object beam with that recorded in a Fourier transform hologram fingerprint matched filter for verification purposes.

2. Description of the Prior Art

Typically fingerprint capture and verification systems include mechanisms for optically capturing images of a fingerprint, mechanisms for optically comparing or interrogating records of fingerprint images with contemporaneous fingerprint images, and signal comparison/computational processors (computers) for analyzing and providing output indicative or as a consequence of a match between a permanent fingerprint record and a contemporaneously captured fingerprint image. The preferred fingerprint record for such systems is a hologram or holographic interference pattern created utilizing an object beam and a reference beam emanating from a common coherent (laser) light/radiation source. The object beam has or contains information, i.e., a fingerprint image (or its Fourier transform). The reference beam contains no information or image. The respective beams interfere within a volume of a holographic recording medium generating an interference pattern. Holograms have the unique property of reconstructing the corresponding reference or object light beams when subsequently illuminated by a light beam corresponding with the recording object or reference beam respectively. [See generally Van Nostrand's Scientific Encyclopedia 8$^{th}$ Ed. "Hologram" pp. 1602–1604.]

When interrogating a hologram for pattern identification, comparison and/or verification purposes, a hologram of the Fourier transform of the image, variously described as a spatial or matched filter, is preferred. In an optical context, a Fourier transform of an image is basically performed by a lens transforming an image from spatial to phase domain at a plane containing the focal point of the particular lens. U.S. Pat. No. 3,716,301 Caulfield et al, [col. 4, 11. 12–64] presents an explanation generally describing both the nature of and how to record a hologram of a Fourier transform of a fingerprint image. [It should be recognized that the particular fingerprint image described by Caulfiel et al is dimensionally compressed vertically by a factor of $1/\sqrt{2}$.]

In the Applicant's co-pending applications Ser. No. 08/499,673 filed Jul. 7, 1995 and Ser. No. 08/694,671 filed Aug. 8, 1996 an optical device utilizing the phenomenon of total internal reflection and a holographic phase grating for capturing and provided a dimensionally undistorted optical image of a fingerprint is suitable both for: (i) creating a permanent record of the captured image and (ii) interrogating a previously recorded permanent finger print record.

It should be appreciated that while optically undistorted fingerprint images photographically recorded in transparencies or printed on photographic paper are suitable for manual or visual comparison purposes, because of thickness variations in the recording media, such transparency and print images typically should not be used directly for generating holograms of Fourier transforms of such images, i.e., the spatial or matched filters of the recorded fingerprint images.

Also, existing real time fingerprint verification systems which interrogate holographic Fourier transforms or spatial/matched filters of fingerprint images prerecorded onto an identification card are particularly prone to false positive verifications especially when the matched filters are flooded with light scattered into the interrogating optical beam by "wiping" smears or streaks on the fingerprint capture surface. In such instances, the Fourier transform of the scattered light in the interrogating beam partially correlates with the pattern recorded in the matched filter thus generating optical output at a detector indicating partial correlation. In particular, while it is recognized that the fingerprints of an individual are uniquely different from those of others, the degrees of general similarity between fingerprints of different individuals are typically greater than the degrees of difference. For example, spacing between print ridges and pores per unit length along a print ridge in the same region of right index finger human fingerprints can in fact essentially coincide except for one or two distinctive differences. It is also recognized that human fingerprints typically fall into distinctive patterns or groups, which fingerprint experts currently use for cataloguing purposes. The upshot is that an interrogating coherent object beam containing any fingerprint image when Fourier transformed, will generate a correlation light signal from any Fourier transform fingerprint matched filter. The intensity or magnitude of the correlation light signal is indicative of the degree of correlation between the real time Fourier transform interrogating object beam and the recording object beam used to create the particular fingerprint matched filter. [See U.S. Pat. No. 5,600,485, Iwaki et al, and U.S. Pat. Nos. 4,750,153; 4,837,843; 4,860,254 & 4,961,615, Wenchko et al which describe associative memory systems which utilize the described properties of holographic Fourier transforms matched filters in combination with Spatial Light Modulators (SLMs) for pattern recognition.] Thus scattered light flooding an input interrogating object beam of existing real time fingerprint verification systems can add sufficiently to the correlation optical light signal to change an actual negative correlation to a positive verification.

Existing real time fingerprint verification systems also present alignment and orientation problems. In other words, it is nearly impossible for a finger to be placed in exactly the same position twice on an input scanner surface. This means that it is nearly impossible to create an identical planar image of a fingerprint image (or its Fourier transform) that corresponds in position to that pre-recorded in a matched filter, a problem that becomes even more difficult when different scanner and processing optics are used respectively to capture and record the matched filter image and to capture and interrogate the recorded matched filter with an image.

Alignment typically refers to X-Y position correlation between the Fourier transformed image in the interrogating beam and that pre-recorded in the matched filter, i.e., assuming the Fourier transformed image in the interrogating object beam is in the same plane as the Fourier transformed image pre-recorded in the matched filter, it is the displacement of the interrogating image in the X-Y plane of the matched filter relative to the matched filter image. U.S. Pat. No. 5,541,994, Tomko et al [Col. 8 line 52–.Col. 9, 1. 38] addresses the problem of X-Y correspondence by scanning for location of output peaks of a Fourier transformed fingerprint image transmitted through a spatial light modulator (SLM) receiving input from stored reference filters to define an array of values.

Orientation typically refers to the angular or rotational position correlation of the interrogating image with the matched filter image assuming the respective images are at the same X-Y position, i.e., the degree to which the Fourier transformed interrogating object image is rotated relative to the Fourier transformed matched filter image. U.S. Pat. No. 3,716,301 Caulfield et al [Col. 7, 11. 28–66] suggests a both a dynamic and static optical solution to the problem of orientation. The dynamic solution suggestion involves rotating a dove prism to achieve "opto-mechanical rotational alignment" of the interrogating object image with that recorded in the matched filter [col. 5, 11. 55–62], The static solution suggestion involves spatially multiplexed Fourier transform fingerprint images recorded angularly around a common axis in the matched filter, the angle of incidence of the creating reference beam being slightly different at each different-rotational position. An affirmation-negation signal discrimination circuit receives input from detectors located at different positions to provide a threshold signal indicative of a matched. In contrast, U.S. Pat. No. 5,095,194 Barbanell [Col. 5, 11. 16–32] teaches a simpler dynamic solution contemplating movement of the finger on the input surface as the mechanism for achieving correlation of position of the interrogating Fourier transformed real time image with that recorded in the matched filter to produce a threshold optical signal at an appropriately located detector to detect a reconstructed reference beam pulse in the event of a correlation as the position of interrogating image sweeps around responsive to finger movements on the input surface.

Another factor affecting performance of coherent light—holographic matched filter optical systems for authenticating or verifying an identity is phase correlation. As previously mentioned, a coherent light fingerprint image taken from a transparency should not be used to create a holographic matched filter because of thickness variations in the transparency. Such thickness variations mean differences in optical path length, i.e., variations in phase in the plane of such Fourier transformed image recorded in a matched filter. Accordingly, when the matched filter is subsequently interrogated, real time, by a Fourier transformed of a captured fingerprint image, the magnitude of correlation will depend on the degree of correspondence (or lack thereof) of phase-of the interrogating object beams with that pre-recorded in the plane of the image recorded in the matched filter. Phase correlation problems also arises out of differences in optical path lengths between the recording optical systems creating matched filters and the optical systems comparing real time, captured images to those recorded in the matched filter. For example, even assuming alignment and rotational correlation of the respective interrogating and matched filter images in a credit card system of the type contemplated in U.S. Pat. No. 5,095,194 Barbanell, infinitesimal differences in position on the optical axis of the card matched filter in the verification apparatus can mean the difference between a threshold correlation signal or not.

SUMMARY OF THE INVENTION

The invented real time fingerprint verification system includes a recording apparatus and a verification apparatus each having a fingerprint scanner for generating a flat, dimensionally undistorted, high contrast, fingerprint image, and an intensity sensitive, spatial light modulator (SLM) for receiving and transforming the flat fingerprint image into a planar, coherent light image of the fingerprint. The SLM eliminates phase variations in the respective planar, coherent light output images, and permits optical path length of a recording apparatus to adjusted relative to that of a verification apparatus to assure phase correlation between the pre-recorded matched filter produced by the recording apparatus and the interrogating coherent object beam of a particular verification apparatus interrogating that particular created pre-recorded matched filter.

The planar coherent light image beam of the fingerprint emanating from the SLM in the recording apparatus is Fourier transformed, and input into a microscope objective lens system for expanding the focus to allow mechanical blocking of its central order per the teachings of U.S. Pat. No. 3,716,301 Caulfield et al. The so modified beam is then directed to interact as an object beam with a reference beam from the particular coherent light source to record a holographic matched filter. Similarly, in the verification apparatus, a planar coherent light image beam of the fingerprint taken from the SLM is Fourier transformed and expanded to allow mechanical blocking of its central order whereupon it is directed to interrogate (as an object beam), a previously recorded holographic Fourier transform matched filter of a fingerprint image for determining a match or not between the respective matched filter and interrogating images.

The invented real time fingerprint verification system contemplates a verification device having an optical/mechanical system for either jittering (dimensionally orbiting and rotating) the just captured undistorted fingerprint image written into a spatial light modulator (SLM), or jittering the pre-recorded matched filter relative to the optical axis of the system for assuring coincidence between a real time captured and transformed image and that pre-recorded in a matched filter.

In an embodiment of the invented system, alignment or X-Y correlation of the planar, magnified and blocked, Fourier transformed fingerprint images within the interrogating object beam with that recorded in the holographic matched filter in the plane of the matched filter is accomplished by suitably scanning or orbiting the interrogation object beam, real time, relative to the holographic matched filter or visa versa. In particular, the input coherent light beam to read the SLM is in one embodiment simultaneously deflected along x and y axes of a plane perpendicular to the beam axis using a pair of reflecting surfaces driven by an electromagnetic vibrator per conventional bar code scanning techniques. [See U.S. Pat. No. 5,581,067, Grosfeld, et al and U.S. Pat. No. 5,486,944, Bard, et. al.] The simultaneous deflections of the coherent light input beam orbits or scans the particular transformed, magnified and blocked output object beam relative to the optical axis of the system.

Orientation or rotational correlation of the respective recorded and interrogating planar Fourier transformed fingerprint images is accomplished preferably by inducing a slight periodic angular oscillation rotating the light beam input into or output from the spatial light modulator (SLM) about its the optical axis, or alternatively by inducing a similar slight periodic angular oscillation for rotating the matched filter assembly angularly about its optical axis, i.e., an axis perpendicular to the plane of the recorded filter image. An exemplary embodiment of the invented system contemplates a dove prism rotationally suspended or mounted in a manner which permits a slight rotation about the optical axis. The prism is torsionally restrained to a quiescent or rest position. Perturbing the dove prism assembly (electromagnetically, acoustically or otherwise) induces slight periodic angular rotational oscillation in the writing light beam input into or read from the SLM. In either instance, the coherent light output image beam taken from the SLM, subsequently transformed, expanded, blocked and input into a matched filter periodically oscillates rotating through a angle about its optical axis twice the magnitude of the prism oscillation angle.

In another embodiment of the invented real time verification system, a snapshot of a flat fingerprint image is captured, digitized and processed computationally for dimensionally rotating and orbiting (jittering) an image written to an electronically addressed, digitally controlled SLM which when read, outputs a fingerprint image orbiting and rotating (jittering) in a plane for interrogating a matched filter. [See U.S. Pat. Nos. 5,022,750 & 5,108,172, Flask which describes active matrix reflective projection systems and U.S. Pat. No. 5,600,485 Iwaki et al which describes an optical pattern recognition system utilizing a pair of SLMs.]

Still another embodiment of the invented real time fingerprint verification system contemplates a verification device having an optical/mechanical system for either jittering (dimensionally rotating and orbiting) the just captured undistorted fingerprint image written into a spatial light modulator (SLM), or jittering the pre-recorded matched filter relative to the optical axis of the system.

The unique features and advantages afforded by, as well as the novel aspects of the invented real time fingerprint verification system are more fully explained with reference to the following detailed explanation in context of drawings depicting schematics of demonstrative and exemplary optical systems for simply and reliably identification by authenticating or matching fingerprints presented real time by different individuals to those pre-recorded in hologram matched filters.

DETAILED DESCRIPTION OF PREFERRED AND EXEMPLARY EMBODIMENTS

Figure 1:
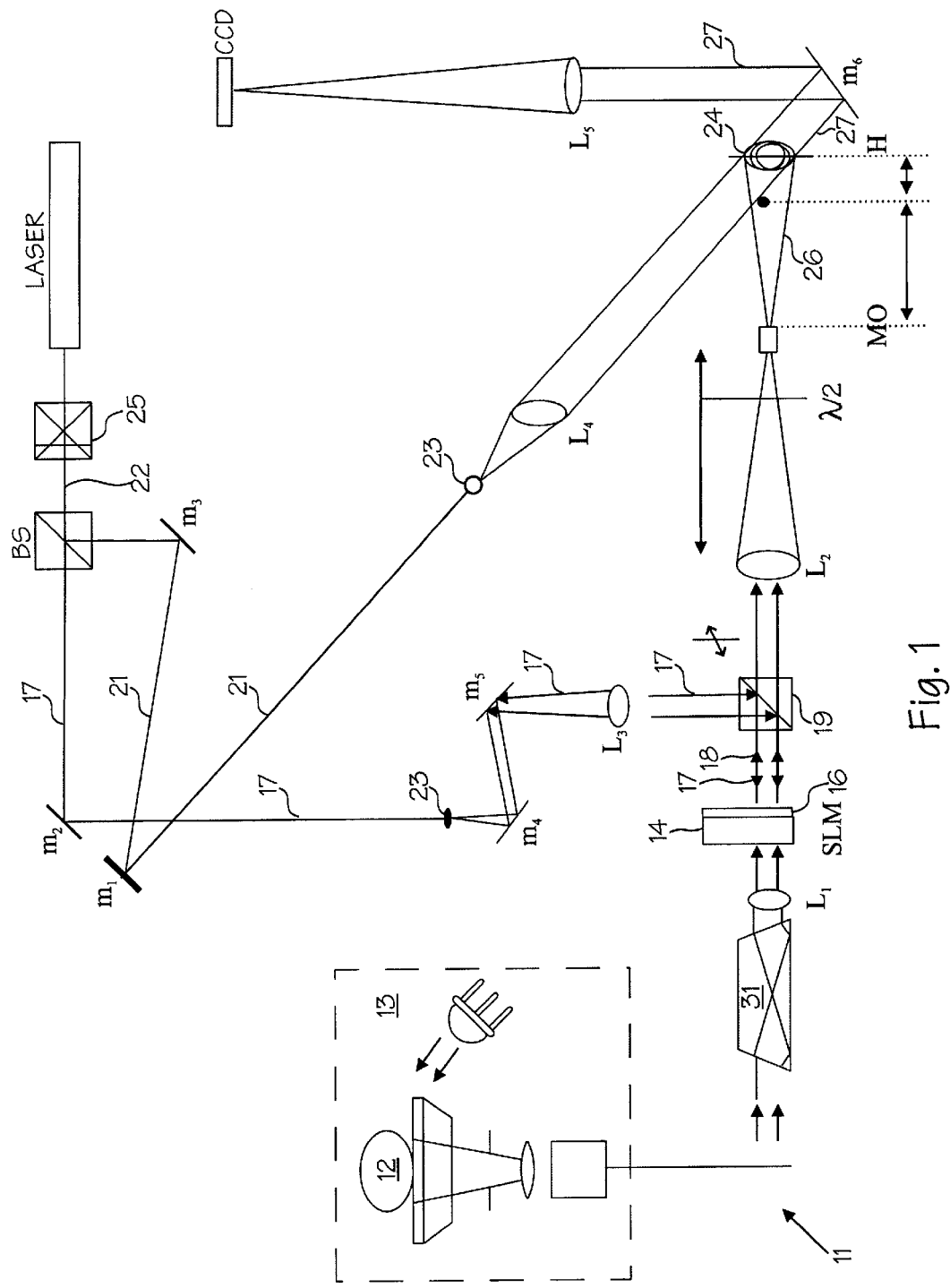
FIG. 1 is a schematic of an exemplary optical table setup illustrating the essential components of the invented real time fingerprint verification system utilizing a dove prism for angularly oscillating and vibrating mirrors for orbiting the fingerprint image.
Figure 2:
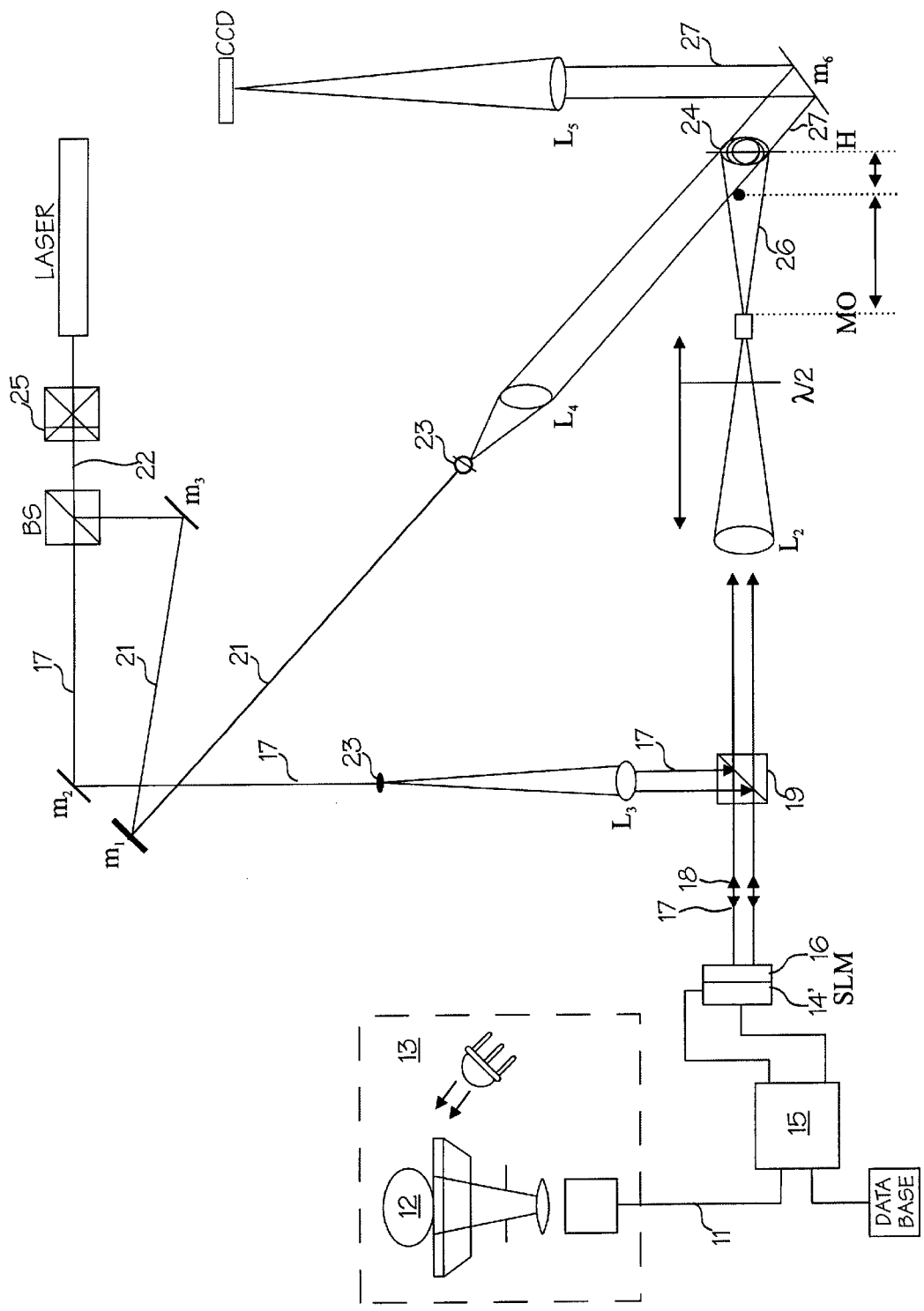
FIG. 2 is a schematic of an exemplary optical table setup illustrating the essential components of the invented real time fingerprint verification system utilizing a computer addressed, digitally controlled spatial light modulator (SLM) for both angularly oscillating and orbiting the fingerprint image.

FIGS. 1 and 2 schematically show an exemplary optical table setup demonstrating both the recording and the verifying apparatus of the invented real time fingerprint verification system. In particular, an undistorted fingerprint image 11 is obtained from a finger 12 utilizing a finger print scanner 13 of the type described in co-pending applications Ser. No. 08/499,673 filed Jul. 7, 1995 in the United States of America by RAMENDRA D. BAHUGUNA and THOMAS M. CORBOLINE entitled "A PRISM FINGERPRINT SENSOR USING A HOLOGRAPHIC OPTICAL ELEMENT"; and (ii) Ser. No. 08/694,671 filed Aug. 8, 1996 in the United States of America by RAMENDRA D. BAHUGUNA entitled "A MINIATURE FINGERPRINT SENSOR USING A TRAPEZOIDAL PRISM AND A HOLOGRAPHIC OPTICAL ELEMENT.

In the optically addressed system, (FIG. 1) the undistorted fingerprint image 11 is optically focused by a lens $L_1$ onto the write face 14 of an intensity sensitive Spatial Light Modulator SLM. In the computer addressed system (FIG. 2) an undistorted graphical video image of the fingerprint 11 is produced by the scanner 13 and input into a computer system 15. The computer system digitizes the graphical video fingerprint image and electronically drives and inputs the digitized graphical video fingerprint image onto an electronically addressed, write face 14' of a digitally controlled Spatial Light Modulator SLM. With the computer addressed system the source of the image of the fingerprint could also be a computer accessed database or other digital signal storage source from which digitized graphics of previously captured undistorted fingerprint images are recorded and stored for retrieval. In both the optically and computer addressed systems, the read faces 16 of the respective SLMs are conventionally read using a coherent light or object beam 17 originating from a laser for transforming the undistorted fingerprint image 11 image written onto the respective write faces 14 & 14' of the SLMs into a coherent fingerprint image beam 18. In the examples illustrated, a polarizing beam splitter 19 directs the object beam 17 from the laser onto the read face 16 of the SLM and then optically transmits the coherent fingerprint image beam 18 reflected from the read face 16 of the SLM.

The recording apparatus also requires a reference beam 21 to create a hologram matched filter, and, in the exemplary optical table setups, a beam splitter BS, splits a reference beam 21 from a source beam 22 gated from a laser by an electronic shutter 25. Steering mirrors $M_1$, $M_2$, & $M_3$ direct or steer the respective object and reference beams 17 & 21 split from the source laser beam 22 to their respective optical destinations, i.e. the object beam 17 to the polarizing beam splitter 19, and the reference beam 21 to the hologram image plane H of the optical setup. Per conventional techniques, both the object and reference beams 17 & 21 should be expanded and cleaned (schematically indicated at 23) using, for example, a 20× microscope objective and a 10–25 m pinhole. The expanded and cleaned object and reference beams 17 & 21 are then shaped (collimated) by lens $L_3$ & $L_4$, respectively. Spacing between steering mirrors $M_1$ & $M_3$ is adjustable for matching (correlating) the optical path length of the reference beam 21 from the beam splitter BS to the hologram image plane H to the optical path length of the object beam 17 from the beam splitter BS via the read face 16 of the SLM to the hologram plane H.

The verification apparatus requires a detector located for detecting and generating a signal in the event of a threshold match between a hologram matched filter 24 and a Fourier transformed interrogating/object beam 26. As schematically shown in the exemplary optical table setups, the reconstructed light beam 27 scattered/diffracted-from the hologram matched filter 24 is directed by steering mirror $M_6$ via a focusing lens $L_5$ onto an appropriately located linear photo detector CCD, in the embodiments illustrated, a Charge Couple Device.

Looking at FIG. 1 (the optically addressed system), mirrors $M_4$ and $M_5$ are oscillated per conventional bar code scanning techniques for optically deflecting the object beam 17 directed via collimating lens $L_3$ through beam splitter 19 onto the read face 16 of the SLM which induces a suitable scanning orbit to the coherent fingerprint image beam 18 reflecting from the read face 16 of the SLM. [Please refer to U.S. Pat. No. 5,581,067, Grosfeld, et al and U.S. Pat. No. 5,486,944, Bard, er. al. and prior art references cited in the patents for teachings relative to orbiting/scanning a light beam in appropriate patterns.]

In particular, bi-directional oscillatory motion in the coherent fingerprint image beam 18 can be achieved by appropriately mounting or suspending one or more optically reflecting elements in an assembly of flex elements and perturbing the assembly with interacting magnetic fields or otherwise. While such perturbed optically reflecting elements can possibly be located anywhere in the optical path after the object beam 17 is expanded and cleaned and the hologram matched filter 24, it is recommended that they be located in the optical path before the SLM. The objective is to cause the pattern (Fourier transformed fingerprint image) in the interrogating/object beam 26 to move or oscillate in the hologram plane H without significantly changing optical path length, i.e. phase distribution in the plane of the focus. In particular, the optical path length (distance) between the read face 16 of the SLM and a mounted or loaded hologram matched filter 24 in the verification apparatus is a known. Accordingly, it is possible to pre-record the hologram matched filter 24 with a (different) recording apparatus such that the optical path length between the read face 16 of the recording SLM and the hologram plane H, i.e. the phase distribution presented by the Fourier transformed recording beam 26, will correlate sufficiently with that of the particular verification apparatus such that, in the event of a match, the particular matched filter 24 when mounted or loaded for interrogation, will scatter/diffract a strong (large magnitude) optical signal (reconstructed reference beam 27) to the CCD. In essence, while the position of the captured 'real time' fingerprint image 11 written to the write face 14 of the verifying SLM might not be at the same position as that written to the write face 14 of the recording SLM for recording its Fourier transform as a matched filter 23, nevertheless, the originating planes of the respective interrogating and recording fingerprint image beams 18 can be optically correlated. Locating perturbed optically reflecting elements before the SLM in the verification apparatus transforms or orbits the X-Y position of the fingerprint pattern read from the read face of SLM such that its Fourier transformed phase distribution in the hologram plane H at some point will sweep through coincidence with the Fourier transform fingerprint phase image recorded in the matched filter. And, in the event of a match a strong optical signal will be scattered/diffracted to the photo detector CCD.

Indicated in FIG. 1, as suggested by Caulfield et al, a dove prism 31 is utilized to rotationally oscillate the orientation or rotational position of the fingerprint image 11 about its optical beam axis. In particular, the dove prism 31 is suspended or mounted in a manner which permits a slight rotation about its optical axis. Ideally, the prism should be torsionally restrained to a quiescent or rest position such that perturbing the assembly (electromagnetically, acoustically or otherwise) causes the prism 31 to oscillate like a pendulum through a slight angle. Assuming the pendulum axis and optical axis coincide, the undistorted fingerprint image 11 input to write face 14 of the SLM will rotationally oscillate through an angle twice that of the prism. Thus, the rotational orientation of the coherent fingerprint image beam 18 read from the SLM, subsequently Fourier transformed into the object/interrogating beam 26 input to the matched filter 24 will also periodically oscillate rotating through a angle about its optical axis twice that of the prism oscillation angle.

As with the deflecting mirrors $M_4$ & $M_5$, a skilled optical technologist should recognize that optically, the dove prism 31 may be located anywhere in the optical path of the exemplary set up from the fingerprint scanner 13 to the hologram plane H. Such skilled technologist should also recognize that there are other well known optical elements which rotate a planar image about an optical beam axis, e.g., a conventional roof prism. In any case, it is recommended that the dove prism 31 or other optical rotator element be located in the optical path between the fingerprint scanner 13 and the read face 14 of the SLM to avoid complications associated with correlating optical path lengths when recording matched filters for a particular type verification apparatus. This is because a dove prism 31 or other optical rotator element, if interposed between the read face 16 of the SLM and the hologram plane H, will change (lengthen) the optical path and therefore phase distribution of the Fourier transformed beam in the hologram plane H. Such change in optical path would necessarily have to be correlated to the optical path of the recording apparatus used in creation of the Fourier transform matched filter 24. In an optical table set up, where both the optical elements and positions of the recording apparatus and the verification apparatus between the read face 16 of the SLM and the hologram plane H are the identical, such correlations are feasible, but they are not for different field apparatus because no two optical components such as dove prisms demonstrate identical or matching optical properties.

Optimally, both the X-Y scanning mechanism and the orientation oscillating mechanism of verification apparatus could be combined into a common 'jitter' optical/mechanical mechanism. For example, by appropriately choosing optical parameters (size, index of refraction and incidence angles) of the optical rotator (prism) element, located to operate on the the coherent fingerprint image beam 18 it is possible to laterally displace the output beam relative to the input beam. Accordingly, slight angular oscillation or jitter of such optical rotator element about the input optical axis, would not only rotationally oscillate the output image beam about its optical axis, but also would orbit it in the X-Y plane. And, by choosing appropriate suspension and perturbing mechanisms in the assembly mounting such optical jitter element, it should be possible to cause the output beam from the rotator element not only to rotationally oscillate but also to scan or orbit in a pattern, which in the X-Y, plane, precesses about a quiescent point ideally coinciding with its optical output axis, similar to the manner a point on a plucked vibrating string elliptically orbits and precesses about the quiescent string position. In an ideal world, where gross alignment of the matched filter in the hologram plane with the optical axis of the interrogating object beam 26 can be assumed, such a jitter mechanism would be incorporated into the optics of the scanner 13 or operate on the captured undistorted fingerprint image beam delivered by the scanner 13 before it is input into the SLM. Another possible alternative would be to provide a mechanism for jittering the assembly mounting or loading the matched filter in a plane perpendicular to the optical axis of a verification apparatus Ultimately, however, from a point of view of simplicity, and economy of construction, per the teachings of Barbanell, (supra), the better practice might be to allow the person whose fingerprint is being captured real time for verification purposes to rotationally oscillate and orbit the captured undistorted fingerprint image 11 by moving a chosen finger on the input surface of the scanner. In fact, such a simple solution could add substantially to the degree security afforded by the invented system in that, when one or more fingerprint images are captured for recording a matched filter 24, the presenting person knows which of the ten finger(s) used, and the approximate rotational orientation of the chosen finger(s) 12 on the input surface of the scanner 13.

In fact, as illustrated in FIG. 2, in the computer addressed system, for verification, the computer system driving the write face 14' of the SLM can be appropriately programmed for both rotationally oscillating and orbiting (jittering) the captured undistorted fingerprint image 11 delivered by the scanner 13 it, about the write face 14' of the SLM. However, a skilled optical technologist should realize that the focus in the focal plane, i.e. the center of the Fourier transform interrogating image, will remain on the optical axis of interrogating beam 26 regardless of the X-Y position of the fingerprint image on the write face 14' of the SLM. Accordingly, in those instances where gross alignment in the hologram plane H can not be assured between the prerecorded matched filter mounted/loaded in the verification apparatus and the optical axis of the Fourier transformed interrogating beam 26, deflecting mirrors $M_4$ and $M_5$, as previously described with reference to the optically addressed system shown in FIG. 1, may be located for optically scanning or orbiting the interrogation object beam 26 real time, relative to the holographic matched filter 24

In both the optically addressed and the computer addressed embodiments of the invented real time fingerprint capture and verification systems, (FIGS. 1 & 2) the coherent fingerprint image beam 18 transmitted by the beam polarizing beam splitter 19 is Fourier transformed by lens $L_2$ and directed through a λ/2 waveplate to rotate beam polarization 90°. The Fourier transform of the object/interrogating image beam 26 (the focus) formed by $L_2$ is expanded by a microscopic objective lens MO. The central order of the Fourier transform of the image is mechanically blocked using conventional techniques and focused on the hologram plane H.

In the recording apparatus, a thermoplastic holographic film recording medium is located in the hologram plane H whereupon the expanded and blocked object/interrogating beam 26 interferes with the reference beam 21 for recording a hologram of the expanded and blocked Fourier transform of the fingerprint image 11. When recording the matched filter, as well as when interrogating the such matched filter, the skilled optical technologist should appreciate that the preferred polarization of the respective interfering reference and Fourier transformed object/interrogating beams 21 & 26 should be perpendicular to the plane of the angle between the respective interfering beams in order to maximize the diffraction efficiency of the generated and interrogated hologram. For example, in the perspective of the exemplary optical table set-ups presented in FIGS. 1 & 2, the reference and object/interrogating beams 21 & 26 should be vertically polarized.

Figure 3:
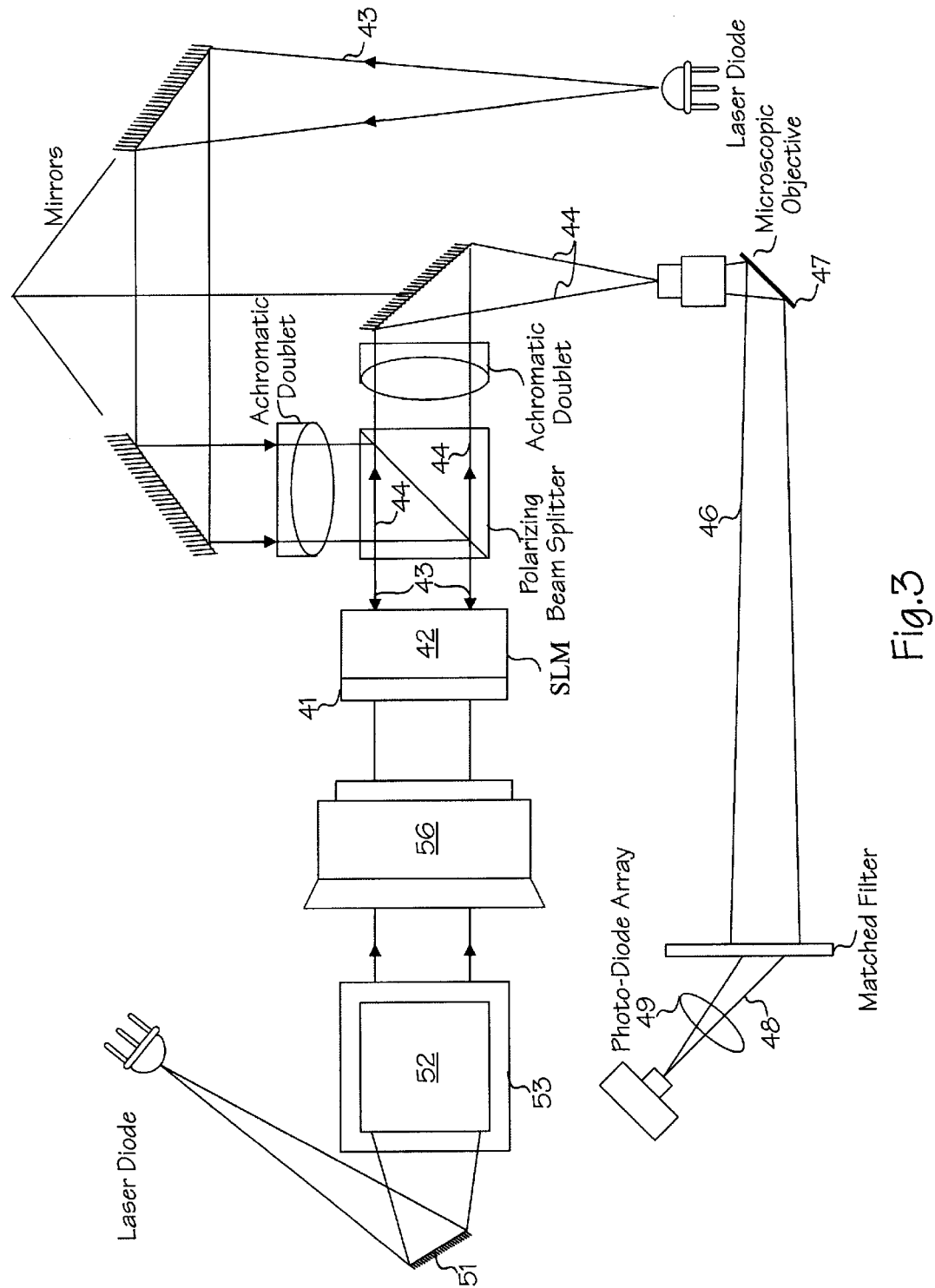
FIG. 3 is an optical schematic of an exemplary 'breadboard' of a miniaturized embodiment of an optically addressed verification device for the invented system.
Figure 4:
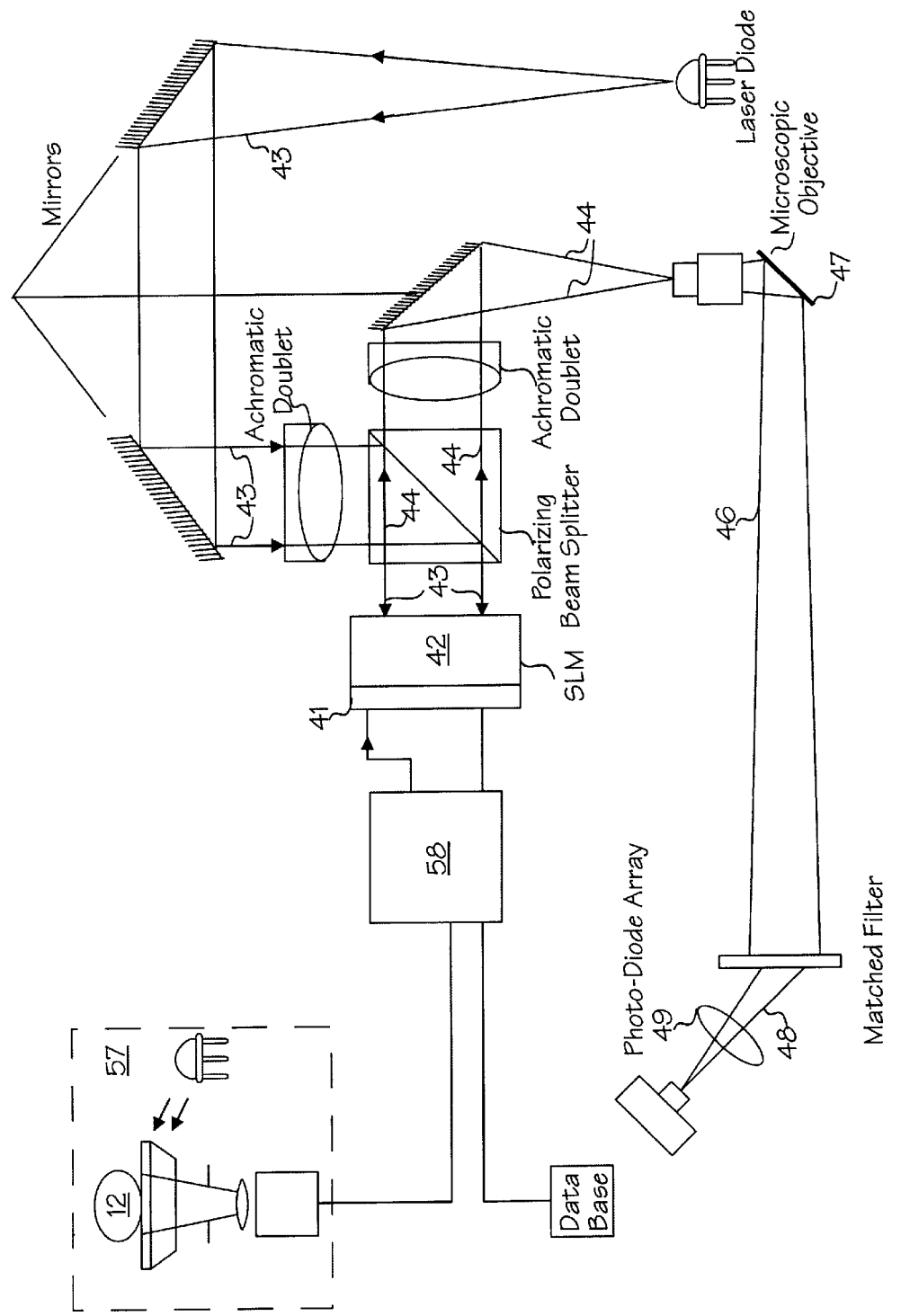
FIG. 4 is an optical schematic of an exemplary 'breadboard' of a miniaturized embodiment of an exemplary verification device of the invented system utilizing an electronically addressed verification device for the invented system.

FIGS. 3 & 4 schematically show a top view of exemplary breadboard set-ups of a miniaturized, optically addressed and computer addressed verification device, In particular, the respective verification devices each include an SLM with a write face 41 and a read face 42 for introducing an image (a fingerprint pattern) into the optical system. An expanding coherent light beam 43 originating from a laser diode is directed by a pair of turning mirrors through a first achromatic doublet lens for collimating then is reflected by a polarizing beam splitter onto the read face 42 of the SLM. A coherent fingerprint image beam 44 reflects from the read face 42 of the SLM and is transmitted by the polarizing beam splitter then Fourier transformed (directed to a focus) by a second achromatic doublet lens. A microscope objective expands the focus of the second achromatic doublet lens into an interrogating image beam 46 which is directed for interrogating a matched filter by a mirror 47. The central order of the transformed image in the interrogating image beam 46, if necessary, can be conventionally blocked mechanically in the optics of the microscope objective or alternatively on the surface of the mirror 47. To explain, if the central order of the Fourier transforms of the fingerprint images recorded as matched filters have been eliminated, then light in the central order of an interrogating Fourier transform of a just captured fingerprint image would not be scattered/diffracted for reconstruction of the constructing reference beam 48. However, such central order interrogating light might well add unacceptably to a partial signal when different, slightly misaligned and/or misoriented interrogating Fourier transform image beams are scattered/diffracted by the matched filter. The reconstructed reference beam 48 scattered/diffracted from the matched filter is focused by a collector lens 49 onto a photo diode array or ccd detector which provides an appropriately large signal at a particular position in the event of a match between the transformed image in the interrogating beam and that prerecorded in the matched filter.

Referring to FIG. 3, in the optically addressed system, a laser diode illuminates a fingerprint input surface 52 of a fingerprint sensor 53 via mirror 51. The fingerprint sensor is preferably of the type described in Applicant Bahuguna's co-pending application Ser. No. 08/694,671 filed Aug. 8, 1996 for capturing and projecting an undistorted fingerprint image. The fingerprint image is received by a conventional camera objective imaging optical system 56 and projected onto the write face 41 of the SLM. A jitter optical/mechanical mechanism maybe incorporated into the camera's optical system 56 for rotating and orbiting the captured fingerprint image on the write face 41 of the SLM. The focal region of the coherent fingerprint image beam 44 reflected from the read face 42 of the SLM may also be jittered in the X-Y plane of the match filter by an appropriate mechanism periodically tilting one or more of the steering mirrors directing the coherent light beams 43 & 44 to the match filter. Digital micro-mirror and/or deformable micro-mirror eletro-optic mechanisms incorporated into a digitally driven SLM would also be appropriate for directing light reflected from its read face 42 for scanning or jittering the focal region of the coherent fingerprint image beam 44 in the X-Y plane of the match filter. [See, for example U.S. Pat. No. 5,612,713 Bhuva, et al "Digital Micro-Mirror Device With Block Data Loading"; U.S. Pat. No. 5,471,584, Blaxtan, et. al. "Spatial Light Modulator With Sub-Divided Modulation Elements"; U.S. Pat. No. 4,295,710, Heinz, T. "Deformable Mirror With Dither" and U.S. Pat. No. 5,396,364 O'Meara: et al "Continuously Operated Spatial Light Modulator Apparatus And Method".]

Referring to FIG. 4, in the computer addressed verification system, a fingerprint image scanner 57 captures and generates an undistorted video image fingerprint which is digitized or otherwise operated on using conventional techniques for allowing a computer system 58 driving the SLM to place a graphical representation of the captured fingerprint image onto the write face 41 of the SLM. As with the previously described larger optical table set-up (FIG. 2) the fingerprint image presented to the computer system 58 could electronically originate from another source, such as a database created from flat, ink-based fingerprint records. This would allow verification or comparison of stored fingerprint data with that pre-recorded on a matched filter provided by a presenting individual. As previously pointed out, the computer system 58 can be appropriately programmed to jitter the fingerprint image written to the write face 41 and reflected from the read face 42 of the SLM.

The skilled optical designer should appreciate that when scaling down from large and stable optical table set-up, besides concern about space for component layout, attention must be paid to location of thermal loads and heat sinks, and the affect such thermal factors can have on optical parameters of the device. In miniaturization, particularly of verification devices, the objective is to assure a constant optical path length for a chosen wavelength of light between the read face 42 of the SLM and the hologram plane where a holographic matched filter must be consistently and precisely either mechanically mounted or loaded for interrogation. Details of location of power supplies, and mechanisms for dissipating thermal energy generated by the electrically driven components is a well developed field and technical discipline, and reference should made to those published teachings and suggestions in designing the verification and recording components of the invented system. As well, the mechanical mechanisms that mount, load and reload the matched filters and position them precisely in the hologram plane of the device are not described. The skilled optical designer should consult and follow published teachings and suggestions in the mechanical arts and disciplines in selecting suitable means and mechanisms for precision placement or positioning of a framed planar body of a relatively flexible (film) material (the pre-recorded hologram matched filter) in a particular plane.

It should also be born in mind, that the verification component of the invented system is the principal field device of the invented system. It is a device that will be located at numerous different physical locations in the field and will be used to transform and compare fingerprint images captured from different individuals to pre-recorded transformed fingerprint images in matched filters. In contrast, the recording component of the invented system can be centralized and large stable optical set-ups maybe practical. The recording component should have sufficient flexibility optically allow a single recording apparatus to be used for recording matched filters for different types or categories of field verification devices, i.e. sufficient flexibility to allow for correlation of optical path length for recording to that of the particular verification apparatus in which the recorded matched filter is expected to be mounted or loaded for subsequent interrogation by a real-time captured, and Fourier transformed fingerprint image.

Basically there should be two different categories of verification apparatus, Private Key Verification Systems [PKVS] and a Public Identification Verification Systems [PIVS].

The Private Key Verification Device [PKVS] should have, in essence, a single, permanently, or infrequently remounted, pre-recorded matched filter for verifying the identity of a single or 'few' presenting individuals to allow access to, for example, a computer workstation, a car, a database storage system, or a physical location. In particular, more than one Fourier transformed matched filter image could be pre-recorded in the hologram mounted as the matched filter each with the constructing reference beam at a slightly different angle such that match signals for a 'few' different individuals are optically projected at different locations in the photo-diode array. In this way, the data processing system receiving and processing the match signals if any from the photo-diode array, could be used not only to allow access of two or more individuals (husband & wife) to a common device such as a car, but also could set the parameters of access permitted different individuals such as family members to a computer system.

In contrast, Public Identification Verification Systems [PIVS] include mechanisms for loading and positioning cards or other objects containing optically accessible, pre-recorded, matched filters supplied by any presenting individual or third party for verifying that the fingerprint (identity) of the presenting individual is the same as that pre-recorded in the presented matched filter. Public identification systems [PIVS] could also include sub-systems for retrieving 'sheltered' private information that may also be recorded and stored in the pre-recorded hologram matched filter per the teachings of Barbanell (supra) U.S. Pat. No. 5,095,194.

Finally, those skilled in optical scanning and image/pattern recognition and conversion art will recognize that the respective recording and verification components of the invented real time fingerprint sensor and verification system may also have utility for converting existing flat, ink-based fingerprint paper records into optically addressable records and even digital signal addressable records, which could be then winnowed and interrogated by anomalous fingerprint images subsequently captured and recorded, either as an actual ,or as a Fourier transform of a flat, dimensionally undistorted image.

The invented real time fingerprint verification system has been described in context of large optical table set-ups which demonstrate the principles and functionality of the invention. It has also been described in context of preliminary 'breadboard' miniaturized embodiments of verification devices. Skilled optical technologist should recognize and appreciate: (i) the described large optical table sets can be modified and optimized into a component suitable for large (commercial) scale recording of holographic Fourier transformed images of undistorted fingerprints, i.e., fingerprint matched filters; and (ii) the 'breadboard' miniaturized verification devices can be modified and optimized into particular commercial verification components for comparing a fingerprint image of a presenting individual with that pre-recorded in a mounted or loaded matched filter. Accordingly, while modifications of optical and mechanical components improving and optimizing performance of the invented real time fingerprint verification system may well comprise independent invention which is not described herein, real time fingerprint verification system incorporating such improved and optimized components will still fall within the spirit and the scope of invention as described and set forth in the appended claims.

We claim:

1. An optical apparatus suited for recording fingerprint hologram matched filters comprising in combination:

a. a scanner for generating a flat, dimensionally undistorted, high contrast, fingerprint light image;

b. a recording, intensity sensitive, spatial light modulator (RSLM) having planar write and read faces receiving the flat, dimensionally undistorted, high contrast fingerprint light image from the scanner on its write face, c. a common source of coherent light providing a collimated, coherent light, object beam and a collimated, coherent light, reference beam wherein:

(i) the object beam is directed to the planar read face of the recording spatial light modulator (RSLM) for transforming the received, flat, high contrast fingerprint image received by the planar 'write' face of the spatial light modulator (RSLM) into a planar coherent light fingerprint image; and (ii) the reference beam is directed to a hologram plane located an optical path length (MF) from the read face of the spatial light modulator (RSLM) determined for assuring phase correlation with an interrogating, coherent light object beam image of a fingerprint read from a read face of a verifying spatial light modulator (VSLM) of a verification optical fingerprint apparatus, d. means for optically directing the planar, coherent light fingerprint image from the spatial light modulator to a Fourier transform focus creating a coherent light, phase distribution image of the fingerprint in a focal plane;

e. a lens optically expanding the coherent light, phase distribution image of the fingerprint in the focal plane;

f. an optical element blocking a central region of the expanded, coherent light, phase distribution image of the fingerprint eliminating a central region from the phase distribution image;

g. means for optically directing the expanded and blocked coherent light, phase distribution image of the fingerprint to the hologram plane; and h. an optically sensitive material located in the hologram plane for recording a hologram of the reference beam and the expanded and blocked coherent light, phase distribution image of the fingerprint, whereby, the hologram once developed is suitable as a match filter for any verification optical fingerprint apparatus presenting an interrogating, coherent light object beam of a comparison fingerprint, optical path length (MF) from a read face of a verifying spatial light modulator (VSLM).

2. The optical apparatus of claim 1 further including means for adjusting optical path length respectively of the reference beam and the object beam to the hologram plane, whereby, matched filters may be recorded with optical path lengths correlated for specific optical systems contemplated for optically interrogating the particular recorded matched filters.

3. The optical apparatus of claim 1 wherein the expanded and blocked coherent light phase distribution image of the fingerprint is directed to the hologram plane along an optical axis which intersects with the reference beam at an angle θ in a horizontal plane perpendicular to the hologram plane, and further including means for polarizing the coherent light of the reference beam and the coherent light of the expanded and blocked phase distribution image of the fingerprint vertically with respect to such horizontal plane.

4. The optical apparatus of claim 1 wherein the means for generating a flat, dimensionally undistorted, high contrast, fingerprint image comprises in combination (i) a prism having a base surface, at least one slanted side input surface and a top transmission surface parallel its base surface, (ii)) a flat holographic phase grating having an one flat surface optically coupled with the base surface of the prism and an exterior surface;

(iii)) a thin transparent coverslip optically coupled with, covering and protecting the exterior surface of the holographic phase grating presenting a surface upon which a finger may be pressed to provide a finger-surface interface which both reflects and transmits light, the holographic phase grating diffracting illuminating light totally internally reflecting from the finger-surface interface to propagate as a converging light beam having an axis normally oriented ($\perp$) with respect to the base and top transmission surfaces of the prism;

d) a source of light for illuminating the finger-surface interface through the slanted side input surface of the prism, the illuminating light being refracted and absorbed in areas where finger surface ridges are in contact with the transparent coverslip, and being totally internally reflected in areas corresponding to valleys between and pores in the finger surface ridges not in contact with the transparent coverslip, the total internally reflected light from the finger-surface interface propagating as a converging beam to, through and out the top transmission surface of the trapezoidal prism, the converging beam of light containing a true image of the finger-surface interface wherein the areas corresponding to finger surface ridges in contact with the coverslip are dark, the areas corresponding to valleys between and pores in the finger surface ridges not in contact with the coverslip are bright.

5. The optical apparatus of claim 1 wherein the means for generating a flat, dimensionally undistorted, high contrast, fingerprint image comprises in combination, (i) a right angled prism having a hypotenuse surface and a first and a second right angle surface, (ii) a holographic phase grating plate having a plate surface optically coupled with the first right angle transmission surface of the prism and an exterior plate surface for diffracting light totally internally reflecting from its exterior plate surface to propagate normally ($\perp$) back into the prism, wherein a finger is pressed against the exterior plate surface of the holographic phase grating plate providing a finger-surface interface;

(iii) a source of light illuminating the finger-surface interface through the hypotenuse surface of the prism, the illuminating light being refracted and absorbed in areas where finger surface ridges are in contact with the exterior plate surface, and being totally internally reflected back into the prism in areas corresponding to valleys between and pores in the finger surface ridges not in contact with exterior plate surface of the holographic phase grating plate, the totally internally reflected light containing a true image of the finger-surface interface being reflected out of the second right angle transmission surface of the prism by the hypotenuse surface of the prism, the true image of the finger-surface interface being oriented a plane parallel to the second right angle transmission surface for capture, the areas corresponding to finger surface ridges being dark, the areas corresponding to valleys between and pores in the finger surface ridges being bright.

6. The optical apparatus of claim 1 wherein a two dimensional pattern may be written by digital image format data onto the planar read face of the recording spatial light modulator (RSLM), the collimated coherent light object beam directed to the read face of the spatial light modulator transforming that two dimensional pattern into a planar coherent light image of that pattern, and wherein the flat, dimensionally undistorted, high contrast, fingerprint light image is replicated as a two dimensional pattern in digital image format data which is input into a digital data processing system coupled to the recording spatial light modulator (RSLM) for writing the two dimensional pattern from the digital image format data derived from the flat, dimensionally undistorted, high contrast, fingerprint light image, to the planar write face of the spatial light modulator.

7. The optical apparatus of claim 1 wherein means for generating a flat, dimensionally undistorted, high contrast, fingerprint image comprises, in combination:
  i. a means for providing a bright field having dark pattern presenting a planar image of a fingerprint;
  j. a camera for receiving and converting the bright field and dark pattern of the planar image of the fingerprint into digital image format data;
  k. a central processing unit (CPU) coupled for:
    (i) receiving and processing the digital image format data from the camera; and
    (ii) writing a representation of the bright field and dark pattern based upon the digital image format data to the planar 'read' face of the spatial light modulator.

8. The optical apparatus of claim 7 wherein the means for providing a bright field having dark pattern presenting a planar image of a fingerprint comprises a flat, ink-based, manually recorded, fingerprint image.

9. The optical apparatus of claim 7 wherein the means for providing a bright field having dark pattern presenting a planar image of a fingerprint is a photographic reproduction of a flat, ink-base fingerprint image, manually recorded on paper.

10. The optical apparatus of claim 7 and further including a digital database information storage system coupled to the central processing unit for storing digital image format data for a plurality of fingerprint images, and for providing the central processing unit with digital image format data for particular fingerprint images upon request.

11. The optical apparatus of claim 7 wherein the representation of the bright field and dark pattern based upon the digital image format data written by the CPU to the planar read face of the spatial light modulator has a dark field and a bright pattern.

12. A method for recording fingerprint hologram matched filters comprising the steps of:

a. generating a flat, dimensionally undistorted, high contrast, fingerprint light image;

b. optically projecting the flat dimensionally undistorted, high contrast, fingerprint image onto a planar write face of a recording intensity sensitive spatial light modulator (RSLM);

c. providing a collimated, coherent light, object beam and a collimated, coherent light, reference beam from a common source of coherent light wherein: (i) the object beam is directed for reflection from a planar 'read' face of the recording, intensity sensitive spatial light modulator (RSLM) to create a planar, coherent light fingerprint image; and (ii) the reference beam is directed to a hologram plane;

d. selecting an optical path length (MF) measured from the read face of the recording spatial light modulator (RSLM) to the hologram plane for assuring phase correlation with a interrogating, coherent light object beam image of a fingerprint read from a read face of a verifying spatial light modulator (VSLM) of a chosen verification optical fingerprint apparatus, e. optically directing the planar, coherent light fingerprint image from the spatial light modulator to a Fourier transform focus creating a coherent light, phase distribution image of the fingerprint in a focal plane;

f. optically expanding the coherent light, phase distribution image of the fingerprint in the focal plane;

g. optically blocking a central region of the expanded, coherent light, phase distribution image of the fingerprint eliminating a central region from the phase distribution image;

h. optically directing the expanded and blocked coherent light, phase distribution image of the fingerprint to the hologram plane; and i. recording a hologram of the reference beam and the expanded and blocked, coherent light, phase distribution image of the fingerprint using an optically sensitive material located in the hologram plane; and j. developing the hologram recorded in the optically sensitive material creating a match filter suitable for the chosen verification optical fingerprint apparatus.

* * * * *